United States Patent
Marshall

Patent Number: 6,056,669
Date of Patent: May 2, 2000

[54] SHIFT CONTROLS FOR AUTOMATED SHIFTING MANUAL TRANSMISSIONS WITH RANGE SENSING REDUNDANCY

[75] Inventor: Charles Edward Marshall, Novi, Mich.

[73] Assignee: Ford Global Technologies, Inc., Dearborn, Mich.

[21] Appl. No.: 09/135,041

[22] Filed: Aug. 17, 1998

[51] Int. Cl.⁷ .................. F16H 61/12; F16H 59/12
[52] U.S. Cl. .................. 477/906; 74/335; 340/456
[58] Field of Search .................. 477/906, 907; 701/62, 63; 74/335, 336 R, DIG. 7; 340/456; 200/61.88, 61.91

[56] References Cited

U.S. PATENT DOCUMENTS

| | | | |
|---|---|---|---|
| Re. 34,064 | 9/1992 | Tury et al. | 74/335 |
| 4,203,375 | 5/1980 | Miller | 74/335 |
| 4,642,771 | 2/1987 | Asagi et al. | 477/906 X |
| 4,702,127 | 10/1987 | Cote . | |
| 4,817,471 | 4/1989 | Tury | 74/335 X |
| 4,833,613 | 5/1989 | Mack et al. . | |
| 4,897,790 | 1/1990 | Bieber | 701/56 |
| 4,922,425 | 5/1990 | Mack et al. . | |
| 4,922,769 | 5/1990 | Tury | 74/335 X |
| 4,945,484 | 7/1990 | Cote et al. . | |
| 4,951,205 | 8/1990 | Lowe et al. . | |
| 5,021,764 | 6/1991 | Mabee | 340/456 X |
| 5,088,353 | 2/1992 | Yoshida . | |
| 5,304,981 | 4/1994 | Leising et al. | 340/456 |
| 5,325,083 | 6/1994 | Nassar et al. | 340/456 |
| 5,409,434 | 4/1995 | Furukawa et al. . | |
| 5,420,565 | 5/1995 | Holbrook | 340/456 |
| 5,505,674 | 4/1996 | Furukawa et al. . | |
| 5,534,848 | 7/1996 | Steele et al. . | |
| 5,586,029 | 12/1996 | Schulz et al. | 701/51 |
| 5,601,513 | 2/1997 | Arai et al. | 477/906 X |
| 5,696,679 | 12/1997 | Marshall et al. | 477/906 X |
| 5,715,161 | 2/1998 | Seo . | |

*Primary Examiner*—Charles A. Marmor
*Assistant Examiner*—Scott Lund
*Attorney, Agent, or Firm*—Frank G. McKenzie; Roger L. May

[57] ABSTRACT

An automated shifting system for a manual transmission having a neutral clutch connecting an engine to a multiple ratio transmission, the transmission having servo operated gear shift mechanism. A driver-controlled gear shift switching mechanism is used to activate the servos that effect ratio range changes. A gear shift switching mechanism includes multiple switches for triggering operation of the servos that control the ratio range changes. A range sensing redundancy strategy for the ratio range switches provide improved protection against an unintended change in direction due to three-bit separation between bits of the valid codes and to a range sensing switch failure strategy by identifying when a range change commanded by the driver exhibits a single-point fault condition. A fault condition due to a single-point sensing switch failure is identified even in those instances when a range change commanded by the driver allows continued normal control system operation, although the driver is notified of the failure by a system warning device.

10 Claims, 10 Drawing Sheets

| Item No. | Valid Codes #1 #2 #3 | "At Rest" Error Codes #1 #2 #3 | "Momentary" Error Codes #1 #2 #3 | Comments |
|---|---|---|---|---|
| 1 | 0 1 1 | | | Valid "at rest" state code |
| 2 | 1 0 0 | | | Valid "momentary" state code |
| 3 | | 0 1 1 | 0 0 0 | Switch #1 shorted |
| 4 | | 0 0 1 | 1 0 0 | Switch #2 shorted |
| 5 | | 0 1 0 | 1 0 0 | Switch #3 shorted |
| 6 | | 1 1 1 | 1 0 0 | Switch #1 open |
| 7 | | 0 1 1 | 1 1 0 | Switch #2 open |
| 8 | | 0 1 1 | 1 0 1 | Switch #3 open |
| 9 | | 1 1 1 | 1 1 0 | "A" open ground |
| 10 | | 0 1 1 | 1 0 1 | "B" open ground |

| Item No. | Valid Codes #1 | #2 | #3 | "At Rest" Error Codes #1 | #2 | #3 | "Momentary" Error Codes #1 | #2 | #3 | Comments |
|---|---|---|---|---|---|---|---|---|---|---|
| 1 | 1 | 1 | 1 | | | | | | | Valid "at rest" state code |
| 2 | 0 | 0 | 0 | | | | | | | Valid "momentary" state code |
| 3 | | | | 0 | 1 | 1 | 0 | 0 | 0 | Switch #1 shorted |
| 4 | | | | 1 | 0 | 1 | 0 | 0 | 0 | Switch #2 shorted |
| 5 | | | | 1 | 1 | 0 | 0 | 0 | 0 | Switch #3 shorted |
| 6 | | | | 1 | 1 | 1 | 1 | 0 | 0 | Switch #1 open |
| 7 | | | | 1 | 1 | 1 | 0 | 1 | 0 | Switch #2 open |
| 8 | | | | 1 | 1 | 1 | 0 | 0 | 1 | Switch #3 open |
| 9 | | | | 1 | 1 | 1 | 1 | 0 | 0 | "A" open ground |
| 10 | | | | 1 | 1 | 1 | 0 | 1 | 0 | "B" open ground |
| 11 | | | | 1 | 1 | 1 | 0 | 0 | 1 | "C" open ground |

| SWITCH FAILURE TYPE | ERROR CODES | | | | | |
|---|---|---|---|---|---|---|
| | 000 | 001 | 010 | 111 | 110 | 101 |
| Switch #1 shorted | ▨ | | | | | |
| Switch #2 shorted | | ▨ | | | | |
| Switch #3 shorted | | | ▨ | | | |
| Switch #1 open | | | | ▨ | | |
| Switch #2 open | | | | | ▨ | |
| Switch #3 open | | | | ▨ | | ▨ |
| "A" open ground | | | | | ▨ | |
| "B" open ground | | | | | | ▨ |

Fig. 10b

| SWITCH FAILURE TYPE | ERROR CODES | | | | | |
|---|---|---|---|---|---|---|
| | 011 | 101 | 110 | 100 | 010 | 001 |
| Switch #1 shorted | ▨ | | | | | |
| Switch #2 shorted | | ▨ | | | | |
| Switch #3 shorted | | | ▨ | | | |
| Switch #1 open | | | | ▨ | | |
| Switch #2 open | | | | | ▨ | |
| Switch #3 open | | | | ▨ | | ▨ |
| "A" open ground | | | | | ▨ | |
| "B" open ground | | | | | | ▨ |
| "C" open ground | | | | | | ▨ |

SHIFT CONTROLS FOR AUTOMATED SHIFTING MANUAL TRANSMISSIONS WITH RANGE SENSING REDUNDANCY

TECHNICAL FIELD

The invention relates to multiple ratio automotive transmissions in which ratio range changes are effected by a driver-operated switching circuit.

BACKGROUND ART

Manual transmissions for use in automotive vehicles typically include a main shaft and a countershaft upon which torque transmitting gears are mounted for establishing and interrupting discreet torque transmitting paths. They typically include synchronizer clutches having clutch sleeves that are adjusted to effect driving torque distribution through the gearing. The synchronizers are adjusted by means of a gear shift mechanism including shift forks carried on shift rails. Selection by the driver of a shift rail for a particular ratio is accomplished by adjusting a manually controlled shift lever in one shift plane and shifting the selected shift rail as the shift lever is adjusted by the driver in a different shift plane.

In a so-called shift-by-wire manual transmission, the mechanical shift mechanism is replaced by servo operators that effect shifting movement of the shift rails. The servo operators are controlled by opening and closing ratio controlling switches in a control panel. Such shift-by-wire transmissions require sensors for detecting a defective circuit in any of the switches which would interfere with a ratio controlling sequence or ratio range selection.

DISCLOSURE OF INVENTION

The improvement of the invention can be applied to a transmission having a shift-by-wire ratio control. It comprises a warning system that informs the vehicle operator of a failure that would affect ratio range controlling functions. The invention is characterized by a redundancy strategy that can detect single-point sensing switch failures as well as failures that would interfere with normal shifting functions.

In the case of a single-point switch failure, the improved control system of the invention will allow automated shifting and range selection of the control system, although the operator will be informed of the presence of a single-point switch failure so that remedial servicing can be obtained before a fault condition occurs that would interfere with normal control functions.

The invention provides improved protection, using three-bit separation between the bits of valid codes, against an unintended change in the direction of torque delivery in the transmission due to a range sensing switch failure. It does this by identifying when a range change is being commanded by the driver even when a single-point sensing switch failure is present. It will identify also when a range change is not being commanded by the driver, even when a fault condition is present due to a single-point sensing switch failure. Continued normal operation of the control system can be obtained following the early warning of a single-point switch failure.

Transient error signals might be obtained indicating failure of a range sensing switch when an intermittent failure condition has occurred. An error signal will be observed by the driver, however, only if the total number of error codes in a given time interval exceeds a calibrated threshold number.

Digital error codes are established by the improved control system of the invention to identify the exact type of single-point switch failure present in the system.

BEST MODE FOR CARRYING OUT THE INVENTION

Figure 1:
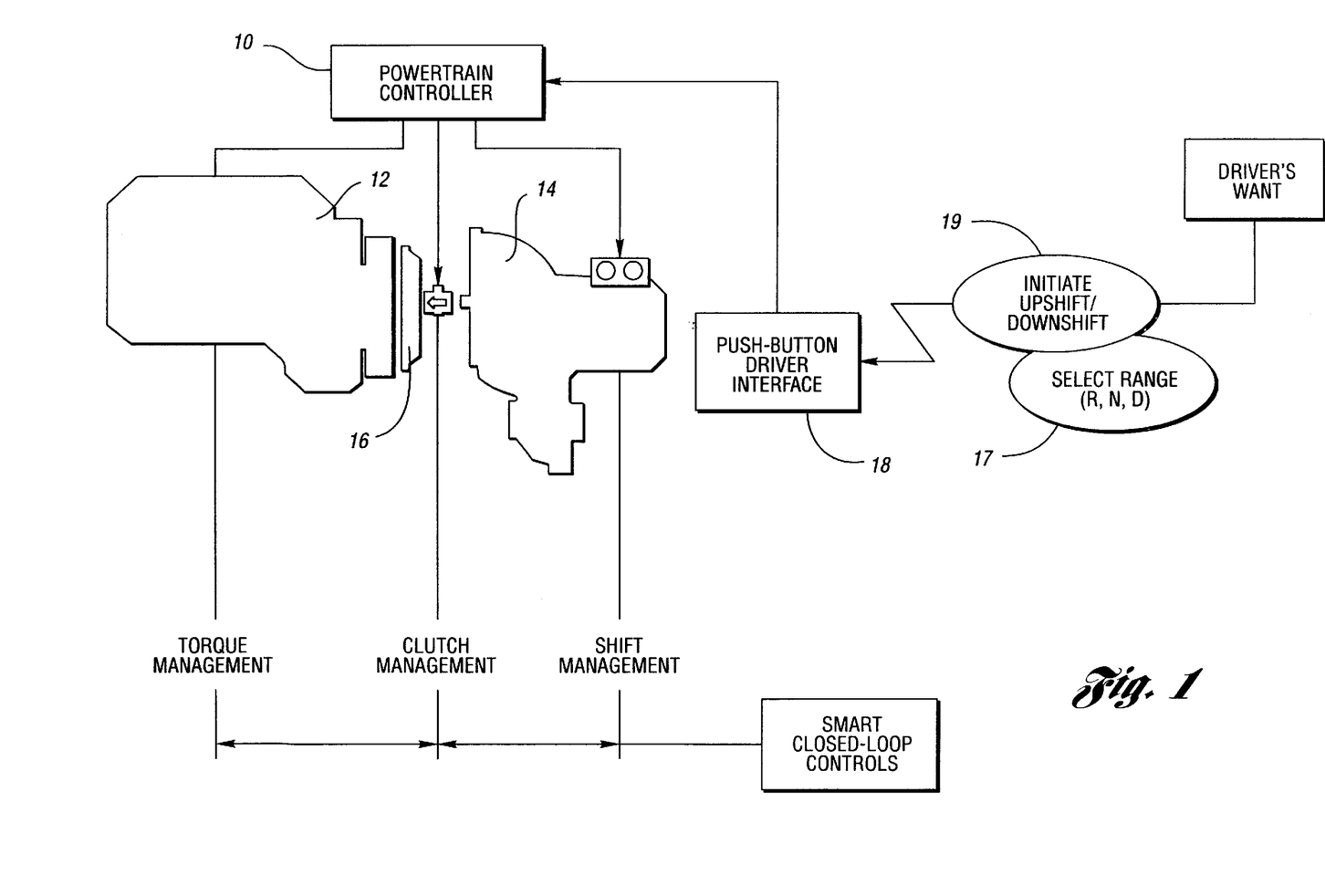
FIG. 1 is a schematic system overview of an engine, a manual transmission, a powertrain controller, and a push-button driver interface indicating the principal subsystems that are involved in automatic control of the clutch and transmission.

A system overview is shown in FIG. 1. It includes an engine and transmission electronic powertrain controller 10 for a vehicle engine 12 and a manually controlled transmission 14. A neutral clutch 16 establishes a driving connection between the crankshaft of the engine 12 and the torque input shaft of the transmission 14. The controller 10 establishes torque management for the engine, clutch management for the clutch 16 and shift management for the transmission 14.

A push-button assembly 18 establishes a driver interface with the engine and transmission powertrain controller 10. Range selection is made at 17 and upshifts and downshifts with selected range "D" are made at 19.

Figure 2:
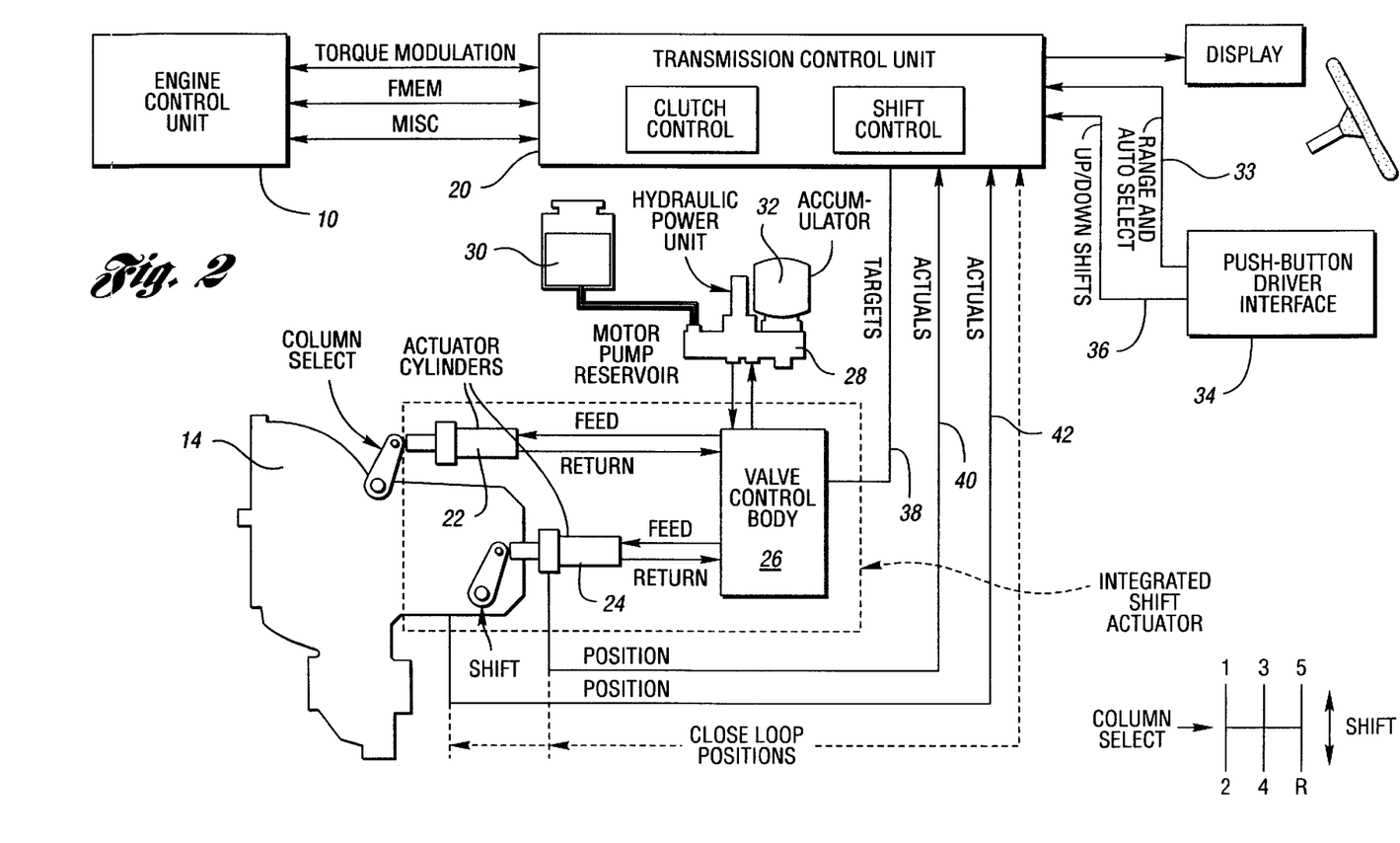
FIG. 2 is a schematic representation of a shift management system including a clutch control module, a manual transmission with actuator cylinders and a control valve body, together with a push-button driver interface.

FIG. 2 shows the portion of the control system that is devoted to shift management.

The transmission control unit 20, for purposes of the shift management system illustrated in FIG. 2, includes a transmission module 20' devoted to clutch control and a shift control module 20" devoted to shift control. The controller 10 also includes an engine control unit 21. The transmission 14 includes actuator cylinders 22 and 24, which respectively control selection of the shift rails for the transmission 14 and the shifting movement of the synchronizer clutch sleeves that are associated with the individual shift rails. Actuating pressure is distributed to the actuator cylinders 22 and 24 by a valve control body 26 through feed and return lines as shown. A hydraulic power unit 28 comprising a pump and motor assembly provides pressure to the valve body 26. The fluid for the pump portion of the hydraulic power unit is shown at 30, and a pressure accumulator on the high pressure side of the pump and motor assembly is shown at 32. Range and auto-select (for D range) selection, accomplished by a push-button driver interface 18, is delivered to the control unit 20 through signal flow path 33. Corresponding manual upshift and downshift signals are delivered from the push-button driver interface 18 through signal flow path 36.

Control unit 20 receives driver input and establishes actuator position targets which are delivered through signal flow path 38 to the valve control body. Feedback signals representing the actual actuator positions are delivered through signal flow path 40 to the control unit 20. These indicate the actual positions established by actuator 24. Corresponding actual position signals for the actuator cylinder 22 are delivered to the control unit 20 through the signal flow path 42. Gear range confirmation and error warnings are displayed by a light, seen at 39 in FIGS. 2 and 3.

Figure 3:
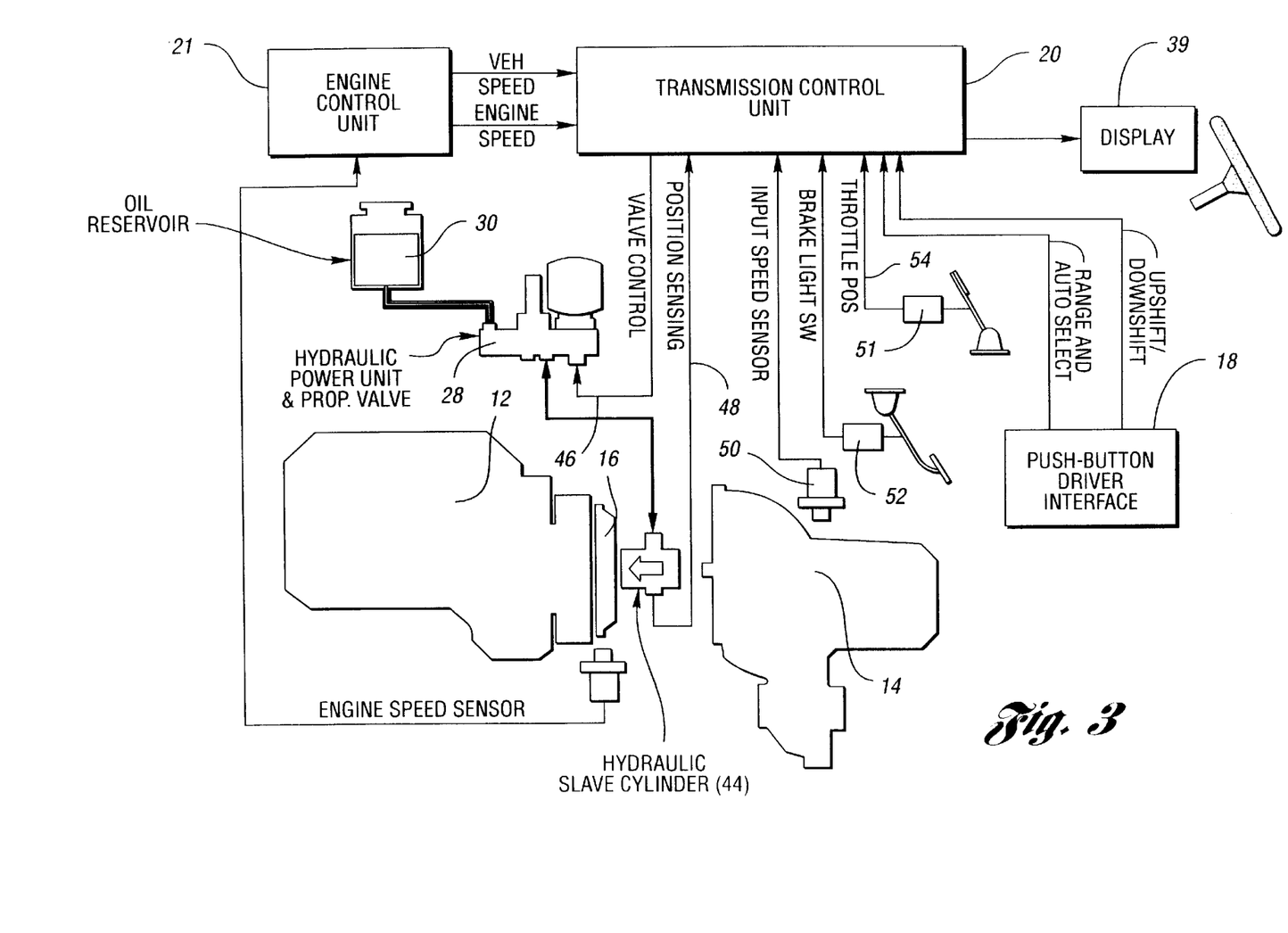
FIG. 3 shows a portion of the control system dedicated specifically to the clutch control.

FIG. 3 shows the portion of the system that is devoted to clutch management. This includes a hydraulic slave cylinder 44, which applies and releases clutch 16. Pressure is distributed to the cylinder 44 from the hydraulic power unit 28. Control unit 20 communicates with the hydraulic power unit 28 through control valve signal distribution line 46. Information concerning the position of the cylinder 44 is fed back to the control unit 20 through signal flow path 48.

Other input signals are received by the control unit 20 from the transmission input speed sensor 50 and from the brake light switch 52. The throttle position signal for the engine 12 is distributed from position transducer 51 to the control unit 20 through signal flow path 54.

Figure 3A:
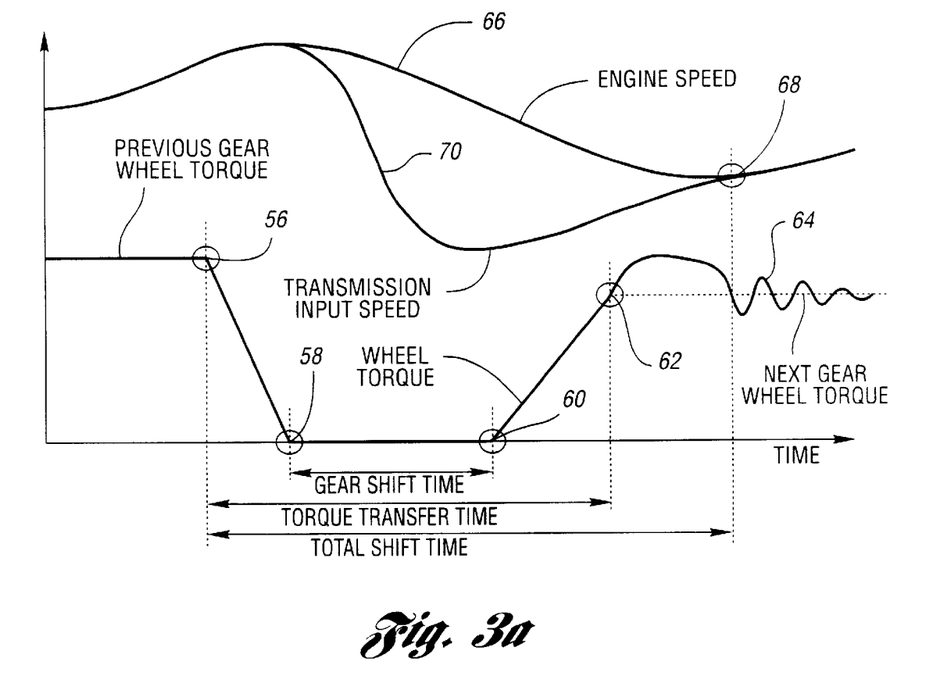
FIG. 3a is a plot of the shift events that occur during a shift interval including wheel torque, transmission input speed and engine speed.

FIG. 3*a* is a plot of wheel torque, transmission input speed and engine speed during a shift interval. A shift is initiated at point 56 of the wheel torque plot when release of the clutch 16 is initiated and the ratio shift is commanded. Upon clutch disengagement, the wheel torque is reduced to 0 at point 58 and remains at that level until the end of the gear shift time at point 60. Upon re-engagement of the clutch, the wheel torque increases to its steady state value at point 62. Assuming that the shift is an upshift, the point 62 is lower in the plot of FIG. 3 relative to the point 56 when the shift is initiated. Upon re-engagement of the clutch, torque fluctuations will occur as shown at 64 until a steady state value is obtained.

The engine speed, beginning at the initiation of the shift at point 56, will decrease because of the control strategy in the engine control portion of the controller. The engine speed continues to decrease in value as shown as 66 until the end of the shift interval at point 68. The transmission input speed also decreases at the intermediate part of the total shift time, as shown at 70. It achieves a steady state condition following completion of the shift at point 68.

Figure 4:
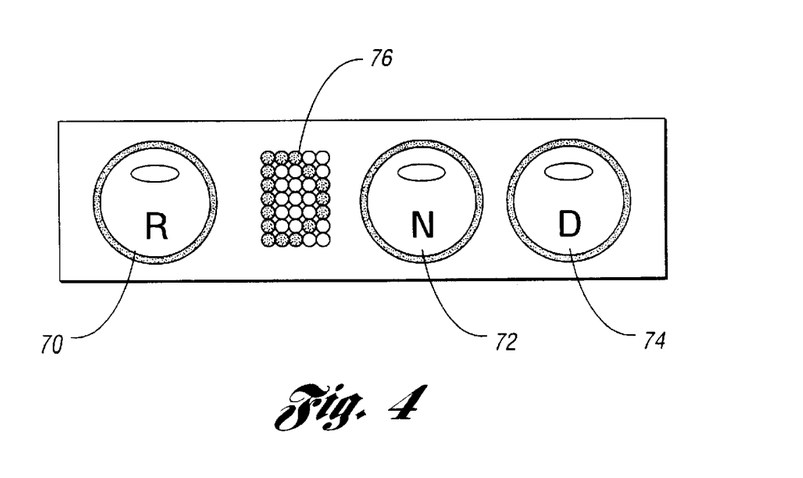
FIG. 4 is a schematic representation of the push buttons on the console of the vehicle that are actuated by the driver in the control of the transmission clutch and the ratio changing actuators.

A series of push buttons is located on the vehicle console. These include a reverse button 70 as seen in FIG. 4, a neutral button 72 and a drive (forward) mode button 74. The mode that is chosen by the push buttons 70, 72 and 74 is indicated at a visual display 76. The reverse button selects reverse gear from the neutral state. The neutral button 72 selects geared neutral. The neutral mode must be selected before a range change request between drive and reverse can be executed. The drive button selects the forward automatic shift mode from the neutral state. The drive mode allows start-up in first gear with automatic upshifts and downshifts through all forward gear ratios. A manual select shift start-up mode is available in first gear or second gear with driver control of upshifts and downshifts. For this purpose, rocker switches, not shown, are located on the steering wheel to permit the driver to select the SSM mode and to request upshifts and downshifts. A vehicle must be in the drive mode before the SSM mode can be selected.

Figure 5:
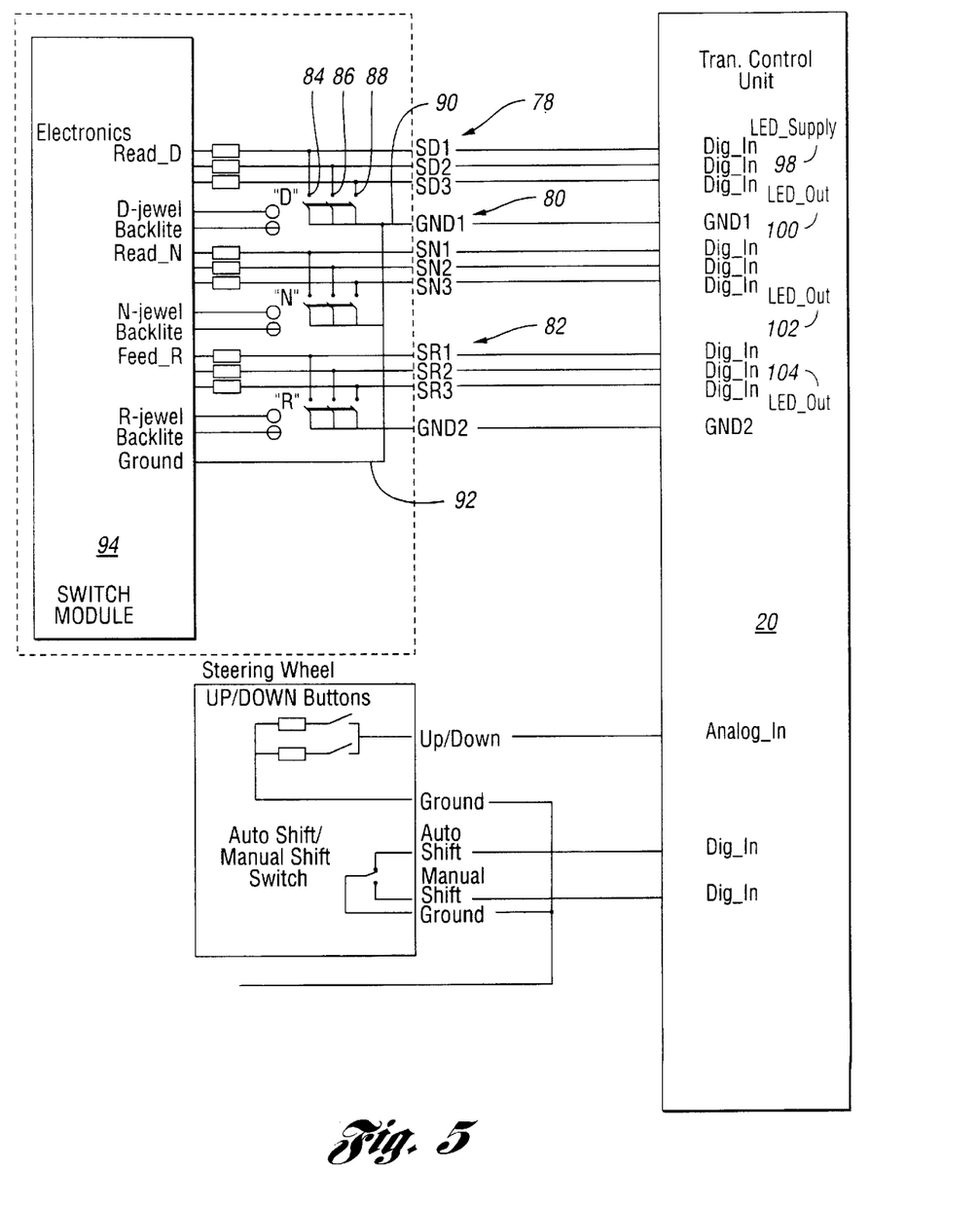
FIG. 5 is a schematic drawing of one embodiment of range sensing switches with inherent redundancy.

In FIG. 5, a push-button switch assembly for drive ratio selection is shown at 78. Two other switch assemblies for neutral and reverse selections are shown at 80 and 82. Each switch assembly comprises three switch elements. The switch elements for switch assembly 78 is shown at 84, 86 and 88 in the embodiment of FIG. 5. Switch elements 84, 86, and 88 are arranged in parallel with a common ground 90. A redundant ground, shown at 92, extends to a ground pin on the switch module 94 and the transmission control unit 20.

Switch elements 84, 86, and 88 are activated when the D push button is pressed by the driver. Corresponding switch elements for the neutral push button are activated when switch assembly 80 is pressed. Similarly, the switch assembly 82 establishes reverse drive mode when the reverse push button R is pressed by the driver.

Each switch assembly establishes three independent signals. These are identified as SD1, SD2 and SD3 in the case of the D operating mode. Signals for the N mode are identified as signals SN1, SN2 and SN3. The signals for the reverse mode are identified as SR1, SR2, and SR3. These signals are received by a transmission control unit 20 which receives the outputs from the selected switches as digital input information (DIG_IN).

The control unit 20 has a light-emitting diode supply 98 and light-emitting diode output pins shown at 100, 102 and 104. The control unit 20 has digital input signal pins for each of the switching elements, as shown.

Figure 6:
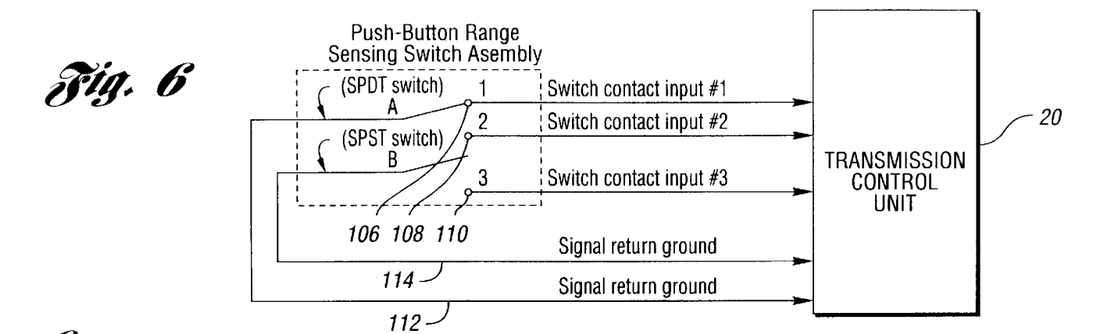
FIG. 6 is a schematic representation of a switching circuit according to a second embodiment.

FIG. 6 shows another embodiment of the switching assembly for the push buttons. Although only one switch assembly is shown in FIG. 6, it should be understood that a similar switch assembly would be used for each of the push buttons N, R and D to establish these ranges.

In the case of the switch assembly of FIG. 6, there is a single-pole, double-throw switch in parallel with a single-pole, single-throw switch configuration. The parallel, single-pole, double-throw switches are shown at 106 and 108 and the single-pole, single-throw switch is shown at 110. The single-pole, double-throw switch is grounded at 112. The single-pole, single-throw switch is grounded at 114.

The switch contact inputs for contact points 106, 108 and 110, as well as the ground inputs for the ground circuits 112 and 114, are received by the control unit at 20.

Figure 6A:
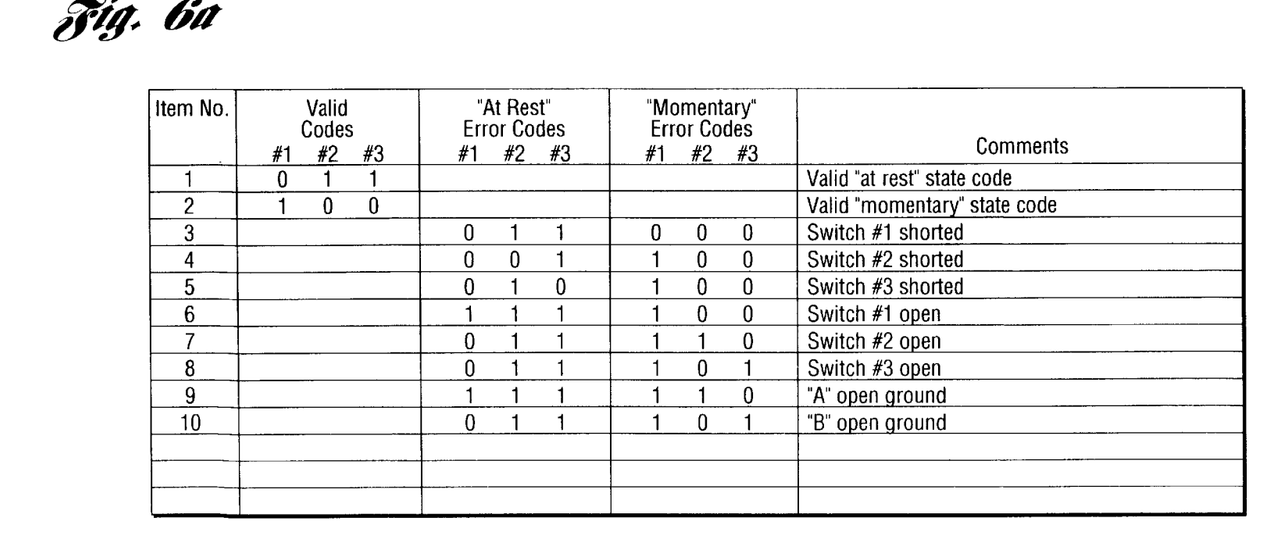
FIG. 6a is a chart showing three-bit digital codes established for the switching circuit of FIG. 6.

FIG. 6*a* shows valid codes and error codes that are established as each push button is pushed. FIG. 6*a* shows ten circumstances, each of which is characterized by separate "at rest" error codes and separate "momentary" error codes. These circumstances are designated by item numbers 1–10. The "at rest" error codes refer to the codes that are established when the push button is not pushed. The "momentary" error codes refer to the codes that are established when the button is pushed.

There are three inputs, each being represented by a separate one of three bits for the various error codes. An open switch or an open circuit would be represented by the symbol "1", and a closed switch or a closed circuit would is represented by the symbol "0". During the "at rest" state, no range change is being commanded. For item "1", switch contact 106 is closed, switch contact 108 is open and switch contact 110 is open. A momentary switch state is enabled when the driver requests a range change. During this momentary switch state, switch contact 106 is open, switch contact 108 is closed, and switch contact 110 is closed.

FIG. 6, unlike FIG. 5, details redundant grounds for each switch.

The control unit 20 has stored in its ROM portion of the memory two valid codes which are indicated in the first column of FIG. 6a. The two valid codes are 011 and 100. Each time a switch assembly comprising the three switch contacts is pushed, a code is established. If the code that is established corresponds to a valid code, an error is not indicated in the visual display. The code that is established as each push button is pushed is compared by the central processor portion of the control unit 20 to the valid codes to determine whether there is correspondence between the current code and one of the valid codes.

The codes that are received by the control unit are parallel bit inputs. There are two independent signal return lines, one for each switch, which are routed back to the control unit 20 to provide robust and secure circuit grounds, as shown at 112 and 114.

Any single-point switch failure that occurs during the at-rest state develops a unique set of codes that will never be repeated in the momentary switch state with a single-point switch failure present. This unique code set is 001, 010, and 111. Because of this property, codes 001, 010, and 111 can be identified as "at rest" codes with a single-point switch failure present. Normal operating system functions can continue with a single-point failure present while at the same time alerting the driver of the presence of a switch failure. This is done by illuminating a system warning light.

During the momentary state, the valid code is 100, unlike the valid code of 011 for the at rest state.

A single-point switch failure that occurs during a momentary state yields a unique set of codes that will never be repeated in the at rest switch state with a single-point switch failure present. This unique code set is 000, 110 and 101. Because of this, code 000, 110 and 101 can be identified as a range change request command with a single-point switch failure present. Normal operating system functions can continue with a single-point failure present while alerting the driver to a switch failure, as explained above.

Each of the error codes identified in FIG. 6a corresponds to a separate condition, which is listed in the right-hand column of FIG. 6a.

Certain single-point switch failures can be masked under a valid "at rest" state code 011 or a valid momentary state code 100. However, these types of failure are easily identified when a switch state change is made. For example, a short in the single-pole, double-throw switch contact will yield a valid 011 "at rest" state code. However, when the next range change command is made, the failure is detected. The range change "momentary" state code yields a reading of 000 with such a failure present. The code 000 is identified as a range change request with a single-point failure present.

The strategy further provides three-bit separation protection against an unintended change in direction. Comparing the valid "at rest" code 011 to the valid momentary code 100, it is apparent that each bit is separated. For the "at rest" code 011 to be translated to the valid momentary code 100, the first switch contact must fail open while the second and third switch contacts must fail shorted.

Figures 8, 8A:
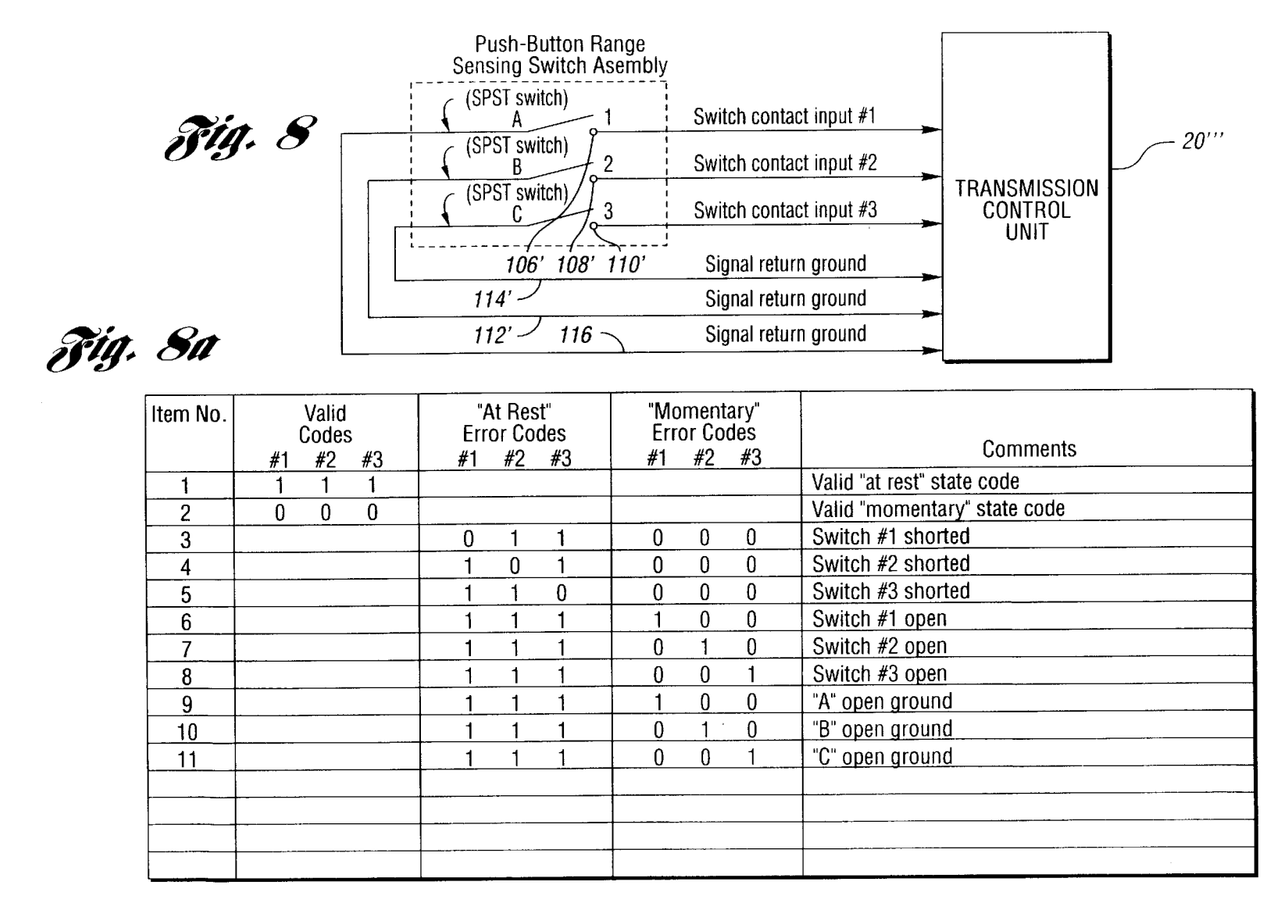
FIG. 8 is an alternate switching circuit design with inherent redundancy.
FIG. 8a is a chart showing three-bit digital codes that are established by the switching circuit of FIG. 8.

FIG. 8 shows three parallel, single-pole, single-throw switch configurations. The valid "at rest" state is shown in FIG. 8. No range change is being commanded. Single-pole, single-throw switch contacts 1, 2 and 3 are open, as shown in FIG. 8. A momentary switch state is enabled when the driver requests a change. During this momentary switch state, the single-pole, single-throw switch contacts 1, 2 and 3 are closed.

Each of the push buttons for drive, neutral and reverse would have three single-pole, single-throw switches wired in parallel, as shown in FIG. 8. The signal from the range sensing switch assembly is sent to a transmission control unit 20''', as shown in FIG. 8. This corresponds to the transmission control unit 20 in FIG. 6. This signal to the control unit 20''' is a parallel three-bit input from the switch contacts 1, 2, and 3. Three independent signal return wires are routed back to the transmission control unit to provide a robust and secure circuit ground.

In FIG. 8a, the "at rest" state has a valid code of 111, where the first bit correlates to switch contact 1, the second bit correlates to the switch contact 2, and the third bit correlates to the switch contact 3. Any single-pole switch failure that occurs during the "at rest" state yields a unique set of codes that will never be repeated in a momentary switch state with a single-point switch failure present. This unique code set is 011, 101 and 110. Because of this, codes 011, 101 and 110 can be identified as an "at rest" code with a single-point failure present. Normal operating function can continue with a single-point failure present while alerting the driver of the switch failure by means of a warning light.

During the momentary state, the valid code is 000, as shown in the first column of FIG. 8a. Any single-point switch failure that occurs during the momentary state yields a unique set of codes that will never be repeated in the "at rest" switch state with a single-point switch failure present. This unique code set is 100, 010, and 001. Because of this property, codes 100, 010, and 001 can be identified as a range change request command with a single-point switch failure present. Normal operating system function can continue with a single-point failure present, although the driver is alerted to the switch failure by a warning light.

Certain single-point switch failures can be masked under a valid "at rest" state code 111 or a valid momentary state code 000. These types of failures can be identified, however, when a switch state change is made. For example, an open single-pole, single-throw switch failure occurring at switch contact 1 will yield a valid at rest state code of 111. However, when the next range change request command is made, the failure is detected. The range change momentary state code yields a 100 error code with the above failure present.

Error code 100 would be identified in the strategy as a range change request with a single-point failure present. This strategy also provides three-bit separation against an unintended change in direction. Comparing the valid "at rest" code 111 to the valid momentary code 000, it is seen that the bits are separated. For the "at rest" error code 111 to be translated into the valid momentary code 000, all switch contacts must fail shorted.

FIG. 8, unlike FIG. 6, shows three independent grounds for the three switches 106, 108 and 110. These grounds are respectively shown at 116, 112' and 114'. In FIG. 8, the numerals with prime notations correspond to numerals used in FIG. 6 to designate corresponding elements.

Figure 7:
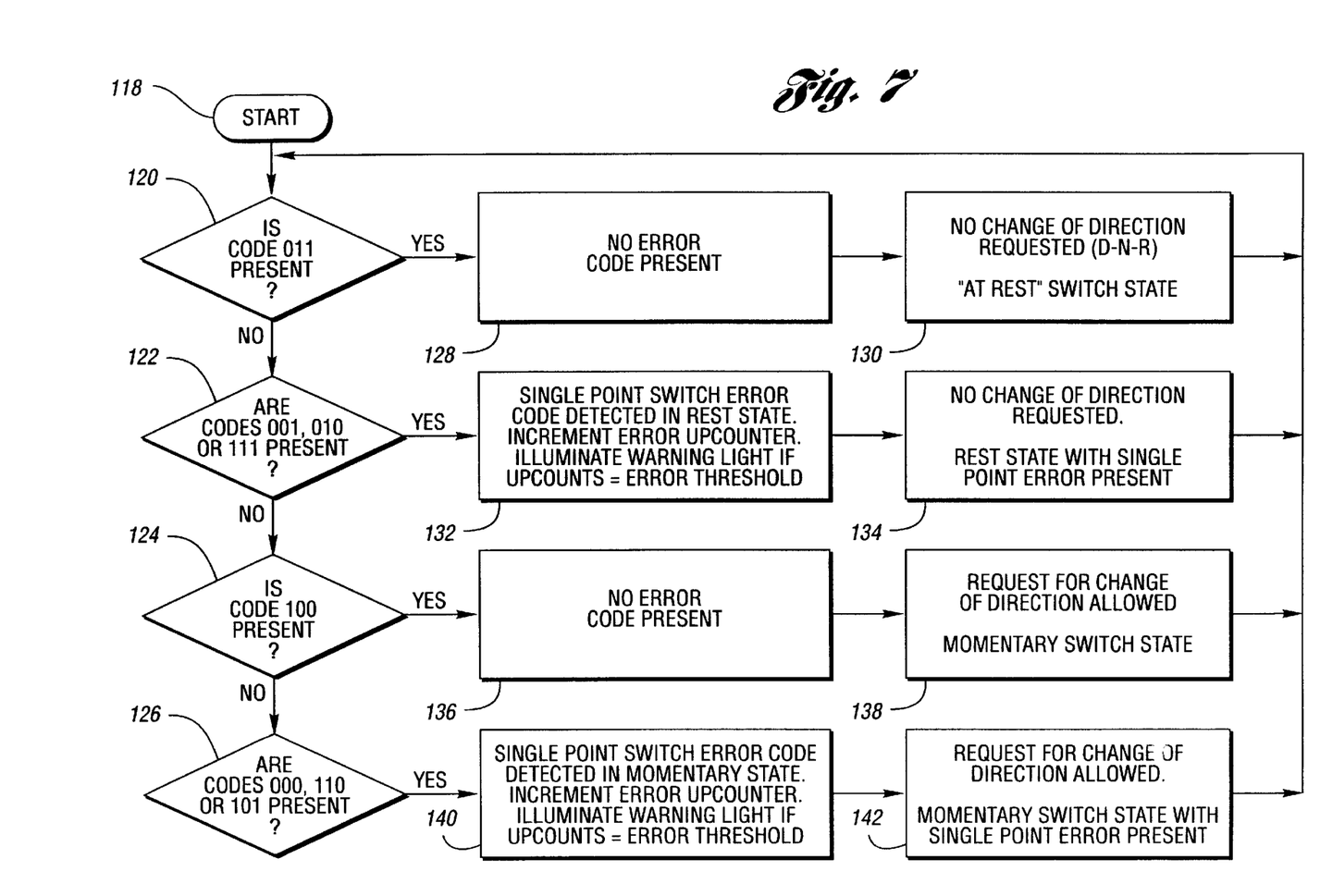
FIG. 7 is a flowchart showing a range sensing redundancy strategy for the automated shifting manual transmission using the switching circuit of FIG. 6.

In FIG. 7, the control strategy is set out in flow diagram form for the parallel, single-pole, double-throw switch and single-pole, single-throw switch configuration of FIG. 6. The control routine starts at 118. Inquiries are made at points 120, 122, 124 and 126 to determine whether the various error codes are present. An inquiry is made at 120 to determine whether code 011 is present. If not, a check is made at 122 to determine whether codes 001, 010 or 111 are present. If these codes are not present, an inquiry is made at 124 as to whether code 100 is present. If it is not present, an inquiry is made at 120 to determine whether codes 000, 110, or 101 are present. A positive answer to any of these inquiries will shift the routine to the right in FIG. 7. Since 011 is a valid code, no error is detected at action block 128 so no change of direction is requested at action block 130 for the "at rest" switch state.

If a single-point switch error code is detected in the "rest state" as a result of a positive response to the inquiry at 122, an up-counter is incremented. If subsequent control loops for the microprocessor controller establish a repeat of the error code and the number of error codes recorded by the up-counter exceeds a threshold value, then a warning light is illuminated. This is shown at action block 132. At action block 134, it is determined that no change of direction is requested but the "at rest" state with a single-point error is indicated.

As a result of the positive inquiry of 124, which means that the code is valid, action block 136 does not record an error code and a change of direction is allowed as shown at 138.

A positive response to the inquiry at 126 indicates, as shown at action block 140, that a single-point switch error code is detected in the momentary switch state. This again will increment the error up-counter. The warning light will be illuminated if the error up-counter records errors above a threshold number. A request for a change of direction can be allowed, as shown at 142, although a momentary switch state with a single-point error present is indicated by the warning light.

Figure 9:
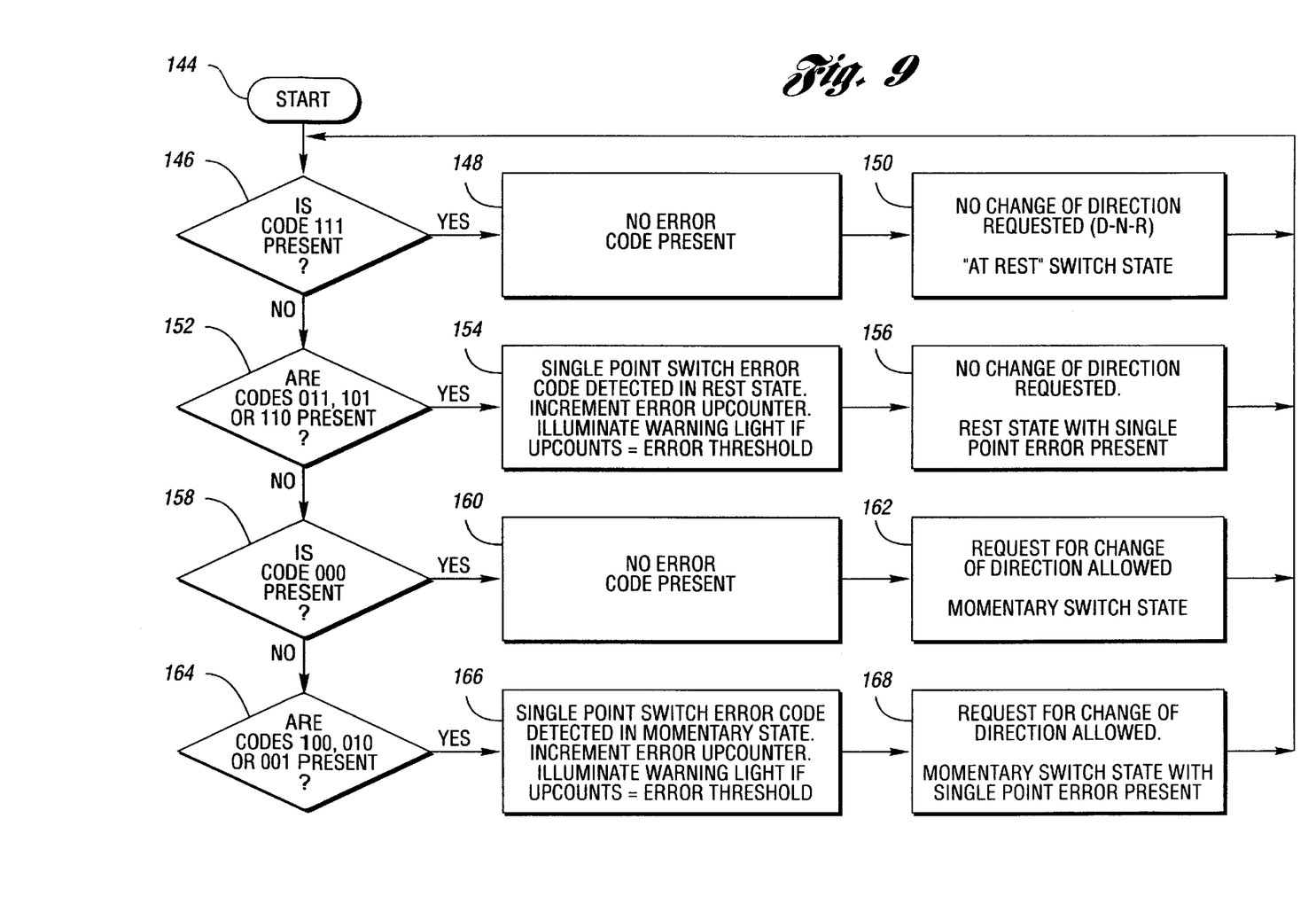
FIG. 9 is a flowchart showing the range sensing redundancy strategy for an automated shifting manual transmission using the switching circuit of FIG. 8.

FIG. 9 shows in flow diagram form the control strategy for the three parallel, single-pole, single-throw switch configuration of FIG. 8. The routine starts at 144, and the presence of an error code is tested as in the case of FIG. 7. At point 146, the processor detects a valid code 111 indicating, as shown at 148, that no error code is present. No change of direction is requested as indicated at 150. If the inquiry at 146 is negative, a test is made at 152 to determine whether codes 011, 101 or 110 are present. If any of these codes is present, a single-point switch error code is detected in the "at rest" state, as shown in 154. This again increments the up-counter. If the error continues and the error threshold is exceeded, a warning light will be illuminated. Under these conditions, no change of direction is requested as shown at 156. If code 000 is detected at 158, that indicates no error is present. A request for change of direction then is allowed, as shown at 162.

If the inquiry of 158 is negative, it is determined whether error codes 100, 010 or 001 are present, as shown at 164. If the inquiry is positive, that means a single-point switch error code is detected in the momentary switch state, as shown at 166. This increments the up-counter; and if the number of up-counts exceeds the threshold, the error warning light is illuminated. A request for a change of direction is allowed even with a momentary switch state single-point error present, as shown at 168.

Figure 10A:
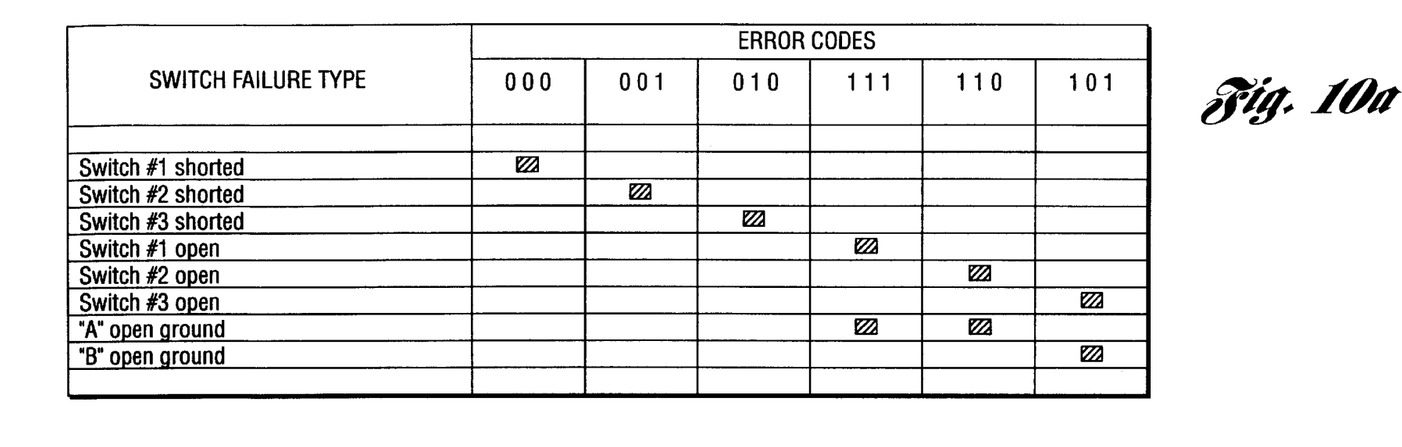
FIG. 10a is a chart showing digital error codes that are established by selected switch failures for use in servicing of the switching circuit shown in FIG. 6.
Figure 10B:
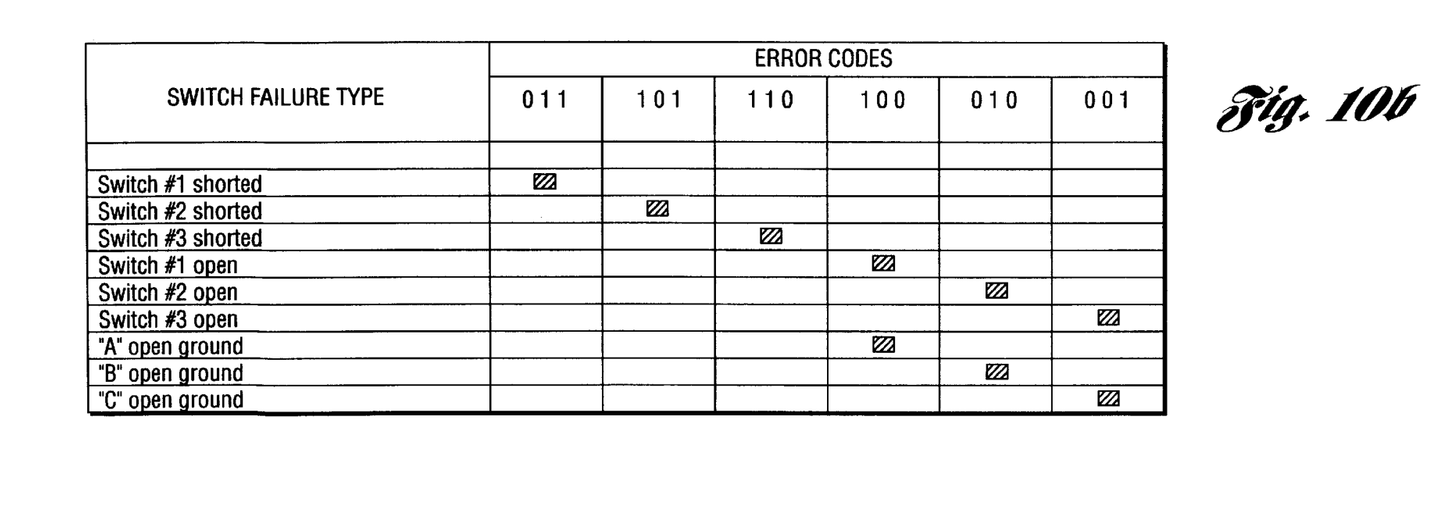
FIG. 10b is a chart showing the error codes for selected switch failures for the switching circuit of FIG. 8.

FIGS. 10a and 10b show tables that are useful for servicing and diagnostic purposes. It is a tabulation of error codes indicating various switch problems. Further, it can be determined, using the error code tabulation of FIGS. 10a and 10b, where the failure occurs. The chart of FIG. 10a corresponds to the single-pole, double-throw and single-pole, single-throw switch configuration (FIG. 6). FIG. 10b, on the other hand, corresponds to the three single-pole, single-throw switch configuration of FIG. 8.

In FIG. 10a, a short in switch 1 is detected if the error code 000 is present. An error code of 001 will detect a short in switch 2 and an error code of 010 will detect a short in switch 3.

An error code of 111 indicates that there are two possibilities for switch failures. Those possibilities are: Switch 1 is open, or ground line 112 is open.

An error code of 110 eliminates all possibilities except two. That is, this error code will indicate that the failure is an open switch 2 or an open ground 112. An error code of 101 indicates that the failure is an open circuit for switch 3 or an open ground circuit at 114.

The corresponding diagnostic chart for the switch configuration of FIG. 8 is shown in FIG. 10b. As in the case of FIG. 10a, the first three error codes tabulated in FIG. 10b designate which switch is shorted. The last three error codes tabulated in FIG. 10b provide two possibilities for failures—either an open switch or an open ground.

Although preferred embodiments of the invention have disclosed, modifications to the invention may be made by persons skilled in the art without departing from the scope of the invention. All such modifications and equivalents thereof are included within the scope of the following claims.

What is claimed is:

1. A push-button range control system for an automotive vehicle driveline having a throttle-controlled engine and a multiple ratio transmission;

servo actuator means for shifting torque transmitting elements of said transmission to effect speed ratio changes;

a hydraulic pressure source for said actuator means;

valve control means for distributing actuating pressure to said actuator means to effect a drive range mode, a neutral mode, and a reverse drive mode;

electronic controller means responsive to operating variables of said engine and said transmission for effecting speed ratio changes in said drive range mode;

a push-button driver interface means communicating with said controller means and including discrete switches for establishing command signals for said controller means to effect selectively each of said modes;

each of said switches having three switch contacts connected to said controller means and multiple signal return grounds, each switch contact corresponding to a separate bit of a three-bit code;

said controller means including a memory having first memory registers for storing valid codes and second memory registers for storing error codes indicating and identifying failures in said switches, each error code corresponding to a separate switch failure; and means for developing a warning signal in response to the presence of one of said error codes.

2. The range control system as set forth in claim 1 wherein said electronic controller means includes an up-counter, said up-counter receiving said error codes and incrementing toward a predetermined threshold value as each error code is detected;

said warning signal being developed when said threshold is exceeded.

3. The range control system as set forth in claim 1 wherein each switch contact of each switch has a separate ground connection.

4. The range control system as set forth in claim 1 wherein two of said switch contacts for each switch have a common ground connection.

5. A push-button range control system with range sensing switches for an automotive vehicle driveline having a throttle-controlled engine and a multiple ratio transmission;

servo actuator means for shifting torque transmitting elements of said transmission to effect speed ratio changes;

a hydraulic pressure source for said actuator means;

a valve control means for distributing actuating pressure to said actuator means to effect a drive range mode, a neutral mode, and a reverse drive mode;

electronic controller means responsive to operating variables of said engine and said transmission for effecting speed ratio changes in said drive range mode;

a push-button driver interface means communicating with said controller means and including discrete switches for establishing command signals for said controller means to effect selectively each of said modes;

each of said switches having three switch contacts connected to said controller means and multiple signal return grounds, each switch contact corresponding to a separate bit of a three-bit code;

said controller means including a memory having first memory registers for storing valid codes and second memory registers for storing error codes indicating and identifying failures in said switches, each error code corresponding to a separate switch failure;

said memory of said controller means having registers storing a range sensing redundancy strategy, each of said switches having redundant switch circuits, a failure in one switch circuit of each switch being a single-point failure and a failure in two switch circuits of each switch being a dual point failure; and means pursuant to said redundancy strategy for developing a warning signal in response to the presence of one of said error codes corresponding to said single-point failure when a range change is commanded while allowing normal control system operation.

6. The range control system as set forth in claim 5 wherein said electronic controller means includes an up-counter, said up-counter receiving said error codes and incrementing toward a predetermined threshold value as each error code is detected;

said warning signal being developed when said threshold is exceeded.

7. The range control system as set forth in claim 5 wherein each switch has valid codes and a series of error codes corresponding to an at-rest switch state when the switch is not activated and a series of momentary error codes when the switch is in an activated state wherein said redundancy strategy develops separate error codes for each switch state for each switch depending upon whether the switch is activated or not activated.

8. The range control system as set forth in claim 7 wherein said redundancy strategy includes unique error codes for each switch state of each switch whereby a failure signal developed by said controller means identifies the switch that is failed.

9. The range control system as set forth in claim 5 wherein each switch has a separate ground connection.

10. The range control system as set forth in claim 5 wherein two of said switch contacts for each switch have a common ground connection.

\* \* \* \* \*